United States Patent [19]
Laio

[11] Patent Number: 5,581,165
[45] Date of Patent: Dec. 3, 1996

[54] DEVICE FOR CONTROLLING ROTATIONAL DIRECTION OF A DIRECT CURRENT MOTOR AND APPLYING BRAKE THERETO

[75] Inventor: Joe Laio, Taichung, Taiwan

[73] Assignee: Regitar Power Tools Co., Ltd., Taichung Hsien, Taiwan

[21] Appl. No.: 328,913

[22] Filed: Jan. 18, 1995

Related U.S. Application Data

[63] Continuation of Ser. No. 259,137, Oct. 18, 1988, abandoned.

[51] Int. Cl.$^6$ .................................................. H02P 3/00
[52] U.S. Cl. ........................... 318/261; 388/937; 408/710
[58] Field of Search .................................. 318/360, 362, 318/245, 366, 256, 261, 269, 258, 280–286, 376, 374; 388/937; 408/6, 9, 10, 12, 14, 15, 710

[56] References Cited

U.S. PATENT DOCUMENTS

| | | | |
|---|---|---|---|
| 3,033,236 | 5/1962 | Rayman et al. | 408/9 |
| 3,828,383 | 8/1974 | Johnstone | 408/9 X |
| 4,223,744 | 9/1980 | Lovingood | 318/245 X |
| 4,292,571 | 9/1981 | Cuneo | 408/9 |
| 4,443,137 | 4/1984 | Albrent et al. | 408/9 |
| 4,650,375 | 3/1987 | Millsap | 318/285 X |
| 4,719,395 | 1/1988 | Aoi et al. | 318/549 X |

*Primary Examiner*—Jonathan Wysocki
*Attorney, Agent, or Firm*—Alfred Lei

[57] ABSTRACT

This invention relates to a mechanism for controlling rotational direction of a direct current motor and a applying brake thereto and in particular to one including a cathode connected to a negative pole of a battery, an anode connected to a positive pole of the battery, a first directional electrode connected to a negative pole of a motor and normally contacting a brake conducting plate, a second directional electrode connected to a positive pole of the motor and normally contacting the brake conducting plate and a switch which cannot be pressed down before moved sidewards and will, when pressed, cause the first directional electrode to separate from said brake conducting plate on one hand but contact the cathode or anode on the other hand, and to cause the second directional electrode to separate from the brake conducting plate on one hand but contact the anode or cathode on the other hand and will, when released, cause the first directional electrode to contact the second directional electrode via the brake conducting plate thereby controlling rotational direction of the motor and applying brake thereto when the switch is turned off.

1 Claim, 4 Drawing Sheets

DEVICE FOR CONTROLLING ROTATIONAL DIRECTION OF A DIRECT CURRENT MOTOR AND APPLYING BRAKE THERETO

CROSS-REFERENCE

This application is a continuation of the U.S. Pat. application Ser. No. 07/259,137, filed Oct. 18, 1988, abandoned.

BACKGROUND OF THE INVENTION

It is found that most motor-driven devices utilize a multi-stage switch to control the rotational direction of the motor and have no braking means. Hence, the operator has to wait until the device is completely stopped before he can carry out the next operation hence wasting time, decreasing production efficiency as well as increasing cost. It is, therefore, an object of the present invention to provide a controlling mechanism for a direct current motor which may obviate and mitigate the above-mentioned drawbacks.

SUMMARY OF THE INVENTION

This invention relates to a mechanism for controlling the rotational direction of a direct current motor and applying brake thereto.

It is the primary object of the present invention to provide a mechanism which may control the rotational direction of a direct current motor and apply a brake thereto when the power source is cut off thereby reducing the waiting time for the next operation and therefore increasing the efficiency and safety.

It is another object of the present invention to provide a mechanism for controlling the rotational direction of a direct current motor and applying a brake thereto which has a positioning rod for extending through a transmission gear of a tool so that the tool can be manually operated even if the battery power is used up or insufficient.

Other objects and merits and a fuller understanding of the present invention will be obtained by those having ordinary skill in the art when the following detailed description is read in conjunction with the accompanying drawing wherein like numerals refer to similar or like parts and in which:

DETAILED DESCRIPTION OF THE PREFERRED EMBODIMENT

Figure 1:
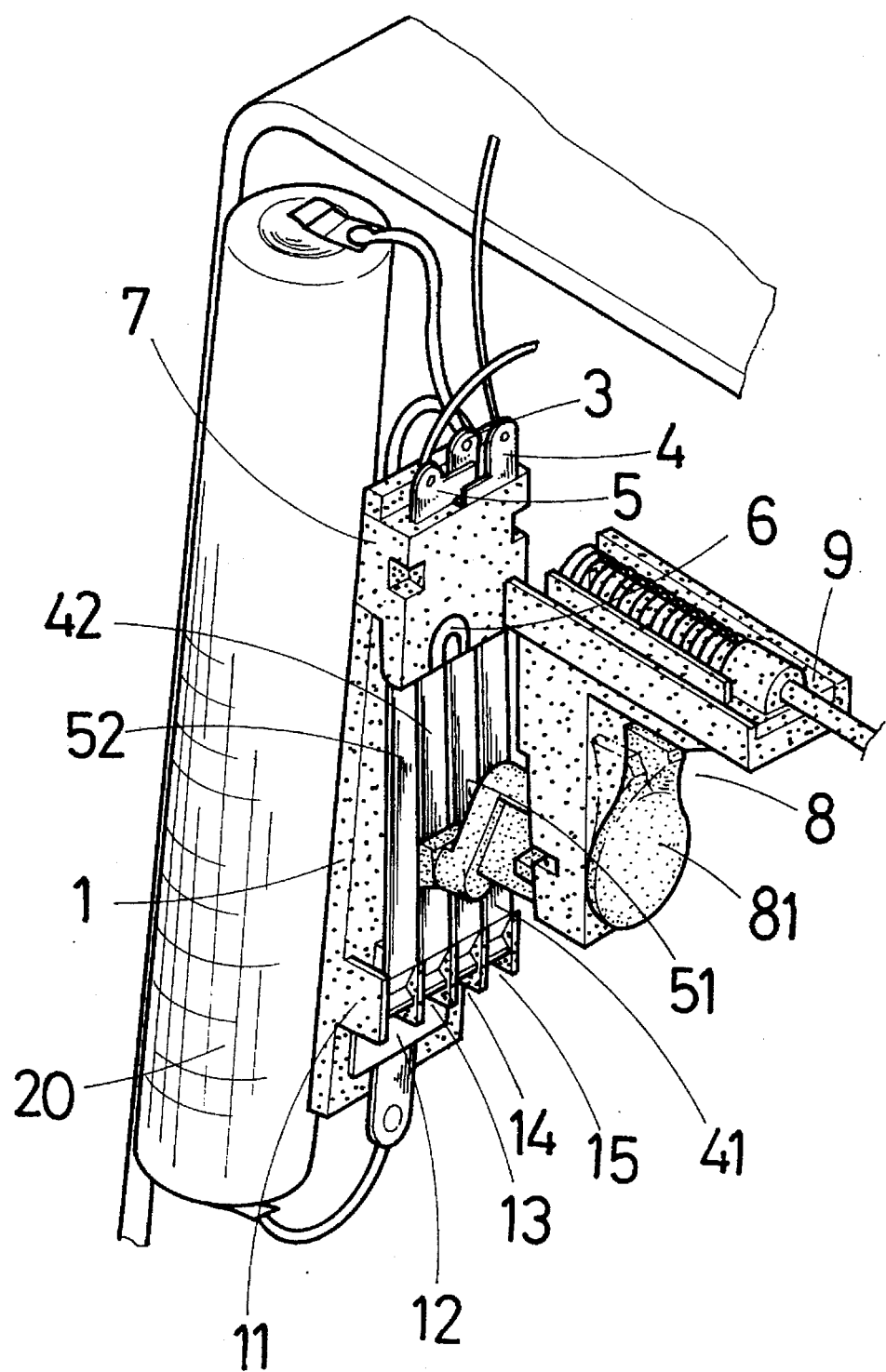
FIG. 1 is a perspective view of a mechanism for controlling the rotational direction of a direct current motor and applying brake thereto according to the present invention.
Figure 2:
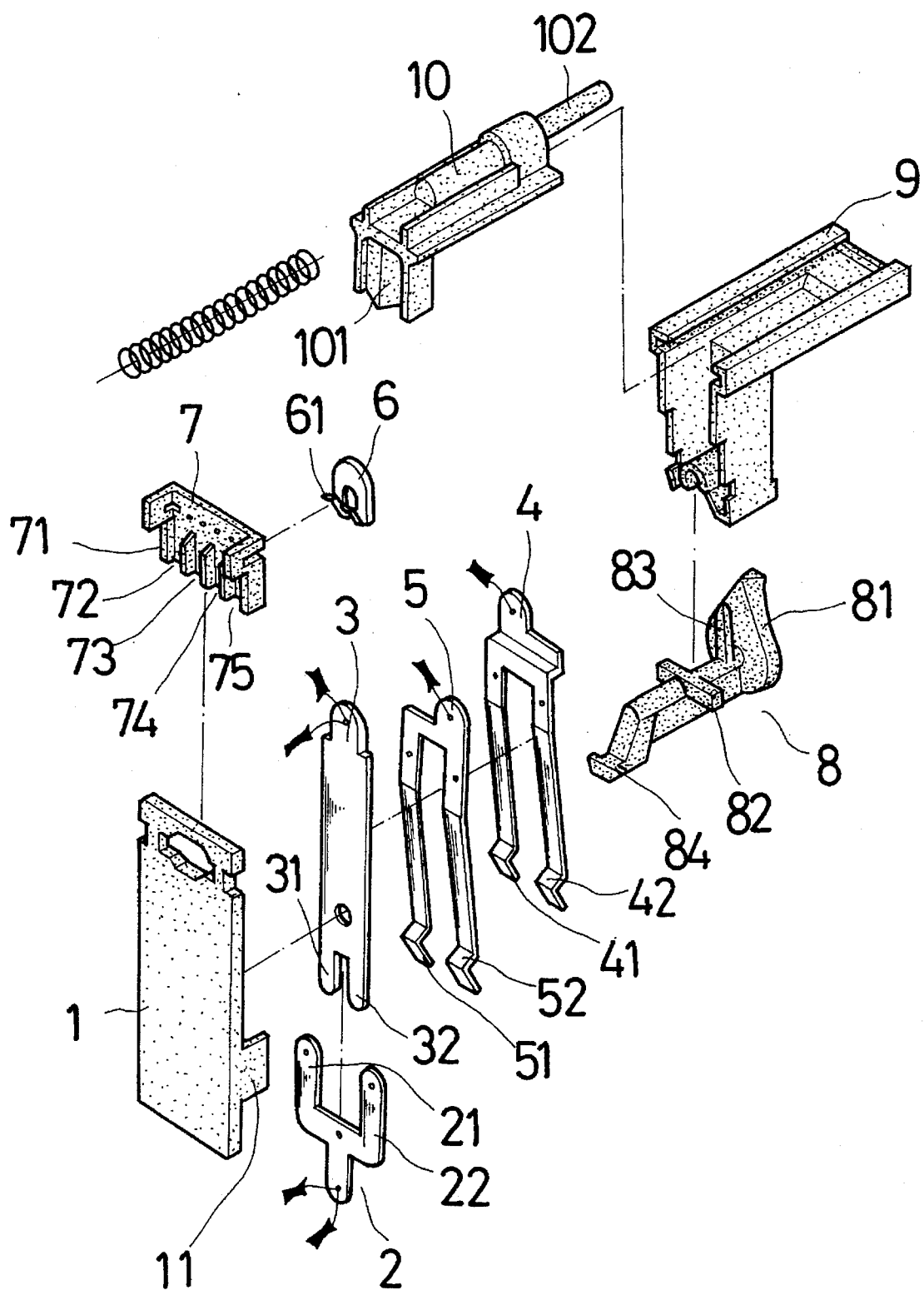
FIG. 2 is an exploded view of the mechanism.

With reference now to the drawings and in particular to FIGS. 1 and 2 thereof, the mechanism for controlling the rotational directional of a direct current motor and applying brake thereto according to the present invention mainly comprises a base plate 1, a cathode 2, an anode 3, a first directional electrode 4, a second directional electrode 5, a brake conducting plate 6, a cover 7, a switch seat 9 and a mechanical braking block 10.

The base plate 1 is a plastic member generally rectangular in shape, with four grooves 12, 13, 14 and 15 divided by five vertical partitions 11 at the lower part thereof. The cathode 2 is a fork-like member riveted at the lower part of the base plate 1, with two forktails 21 and 22 disposed in the grooves 12 and 15 of the base plate 1 respectively. The anode 3 is an elongated conducting strip fixed on the base plate 1 and has two legs 31 and 32 arranged in the grooves 13 and 14 of the base plate 1 respectively.

The cover 7 is made of plastic, the inner side of which is divided into four grooves 72, 73, 74, and 75 by five vertical partitions 71. The brake conducting plate 6 is mounted on the lower part of the cover 7, with two legs 61 and 62 extending into the grooves 73 and 74 of the cover 7. The first directional electrode 4 is an inverted U-shaped member fixedly mounted on the inner side of the cover 7 and has two legs 41 and 42 with their upper parts extending through the grooves 72 and 74 of the cover 7 and their lower parts extending through the grooves 15 and 13 of the base plate 1 respectively. The lower parts of the legs 41 and 42 of the first directional electrode 4 are bent upwards so that they will not get contact the anode 3 and the cathode 2 unless pressed downwards, but the upper part of the leg 42 is in contact with the leg 62 of the brake conducting plate 6 in normal condition and will be separated therefrom when pressed downwards. The second directional electrode 5 is also an inverted U-shaped member which has the same structure at the first directional electrode 5 except the upper portion. The second directional electrode 5 has two legs 51 and 52 of which the upper parts are disposed into the grooves 73 and 75 of the cover 7 and the lower parts are arranged into the grooves 14 and 12 of the base plate 1 respectively. Similarly, the two legs 51 and 52 are bent upwards so that they do not contact the anode 3 and the cathode 2 in normal condition, but the upper part of the leg 51 is in contact with the leg 61 of the brake conducting plate 6 in normal condition and will separate therefrom when pressed downwards. The cover 7 and the base plate 1 can be slug-fitted or otherwise connected together.

The switch 8 is provided with a trigger 81 which can be rotated leftwards or rightwards. The trigger 81 has at the rear side a blocking rod 82 which is adapted to the shell of a tool so that the blocking rod 82 is will be blocked by a protuberance of the shell when the trigger 81 is at the middle position. That is to say, the trigger 81 cannot be pressed inward unless it is first rotated leftwards or rightwards thereby ensuring safe operation. Further, at the rear side of the trigger 81 there is a vertical rod 83. When the trigger 81 is at the middle position, a positioning rod 102 of the mechanical braking block 10 will extend into a transmission gear of the tool thereby preventing the gear from rotating and therefore, enabling manual operation. However, when the trigger 81 is moved leftwards or rightwards, the vertical rod 83 of the trigger will press against a v-shaped surface 101 of the mechanical braking block 10 and move the mechanical braking block 10 backwards. Hence, the positioning rod 102 will withdraw from the gear and the motor can now be turned on.

The present invention will be detailedly described in accompany with the following preferred embodiment.

Figure 3:
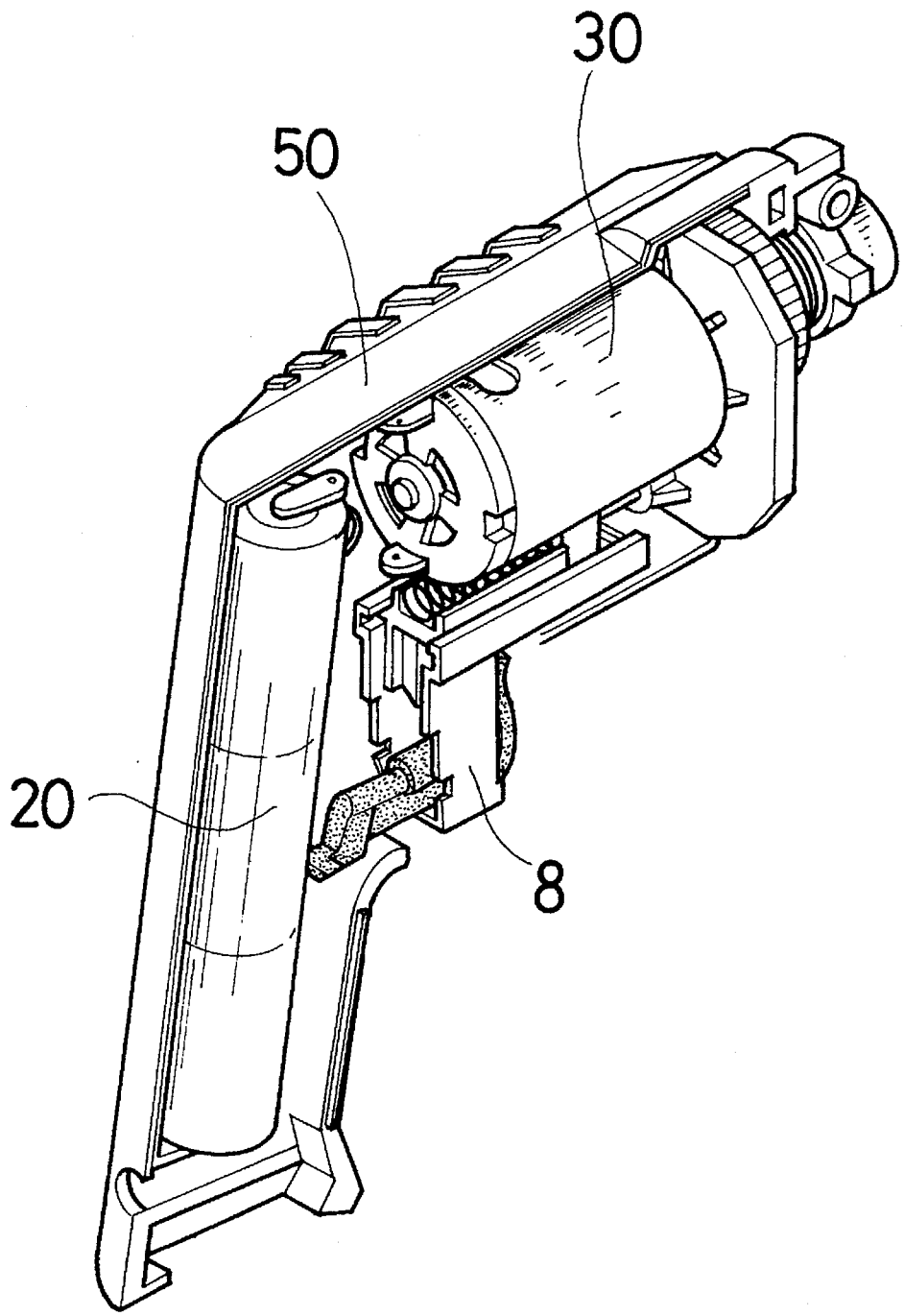
FIG. 3 is a working view of the present invention.
Figure 4:
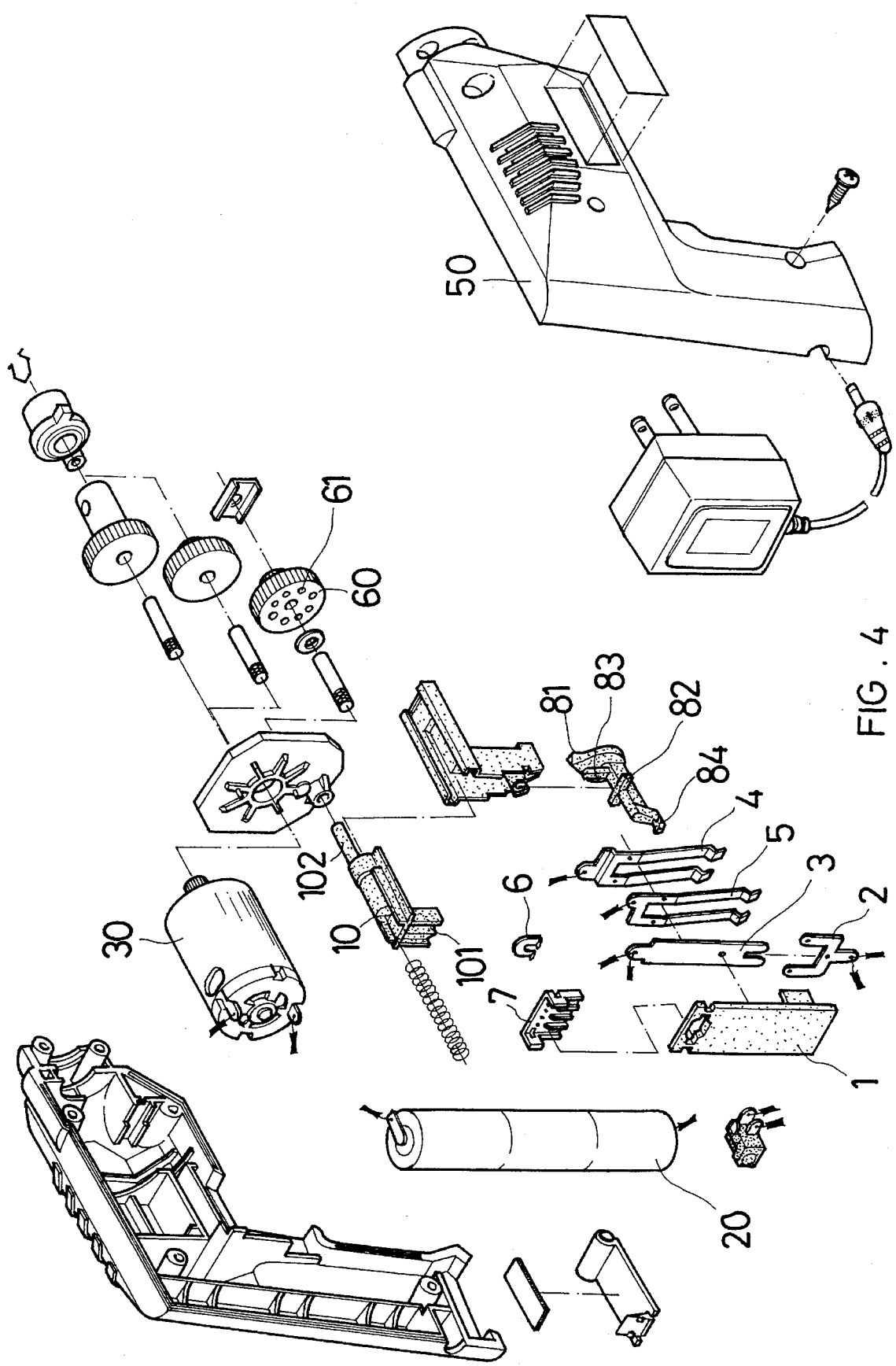
FIG. 4 is an exploded view of FIG. 3.

Referring to FIGS. 1, 3 and 4, the lower end of the cathode 2 is connected to the negative pole of secondary cells 20, while the upper end of the anode 3 is connected to the positive pole of the secondary cells 20. The second directional electrode 5 and the first directional electrode 4 are connected to the positive terminal and negative terminal of the motor 30 respectively. The switch 8, the switch seat 9 and the mechanical braking block 10 are suitably mounted on the shell 50 of an electric driver, which is simple for one having ordinary skill in the art and has no need to be mentioned here in detail.

When not in use, the trigger 81 of the switch 8 is at the middle position and the positioning rod 102 of the mechanical braking block 10 extends into a hole 61 in a transmission gear 60 so that the whole gearing cannot be operated and it is now ready for manual operation. In the meantime, the blocking rod 82 of the trigger 81 will be blocked (not shown) by the shell 50 and so the switch 8 cannot be pressed downwards thereby ensuring safety.

In use, simply turn the trigger 81 of the switch 8 so that the vertical rod 83 at the rear side of the trigger 81 will force the mechanical braking block 10 to move backwards, withdrawing the positioning rod 102 from the transmission gear 60. The whole gearing can now operate again. As the trigger 81 is moved leftwards (see FIG. 1), the end of the trigger 81 will be aligned with the leg 42 of the first directional electrode 4 and the leg 52 of the second directional electrode 5. Then, when the trigger 81 of the switch 8 is pressed inward, the leg 42 of the first directional electrode 4 will separate from the brake conducting plate 6 on one hand but will contact the leg 32 of the anode 3 on the other hand, while the leg 52 of the second directional electrode 5 will contact the leg 22 of the anode 3, thus forming a reverse circuitry which will reverse the direction of the motor 30. Similarly, when the trigger 81 is turned rightwards and pressed inward, the leg 41 of the first directional electrode 4 will contact the leg 21 of the cathode 2, while the leg 51 of the second directional electrode 5 will separate from the brake conducting plate 6 but will contact the leg 31 of the anode 3 thus forming a positive-going circuitry which will cause the motor 30 to rotate in positive direction.

Furthermore, the present invention has a braking action which will stop the motor 30 in a short time thereby reducing the waiting time for the next operation an therefore increasing the working ability and reducing the danger when the tool is not in use. The principle is that when the trigger 81 returns to its original position, the leg 51 of the second directional electrode 5 will contact the brake conducting plate 6 again. Meanwhile, the motor 30 will change from a motor to a generator and the current will flow in a reverse direction thereby braking the motor in a short time.

The invention has been described in the above with reference to a portable screw driver. However, it will be apparent that the invention is not limited to use with a screw driver, but that such a mechanism may be applied to other types of portable power tools which employs a direct current motor as a driving source. Thus, although the present invention has been described with reference to a specific embodiment, various changes and modifications to the embodiment may be envisaged, which fall within the scope claimed for the invention as set out in the appended claims.

The above specification should therefore be interpreted in a descriptive and not in a limiting sense.

I claim:

1. A device for controlling rotational direction of a direct current motor and applying a brake thereto, comprising:

a base plate formed with a first groove, a second groove, a third groove and a fourth groove, said grooves being parallel to each other;

a fork-like cathode connected to a negative pole of a battery and having a first upwardly extending leg and a second upwardly extending leg, said cathode being riveted at a lower portion of said base plate with said first and second upwardly extending legs fitted into said first and fourth grooves of said base plate respectively;

an elongated anode connected to a positive pole of said battery and fixed on said base plate and having a first and second legs fitted into said second and third grooves of said base plate respectively;

a first directional electrode connected to a negative pole of said motor and having a first downwardly depending legs and a second downwardly depending legs fitted into said second and fourth grooves of said base plate and releasably contacting a brake conducting brake;

a second directional electrode connected to a positive pole of said battery and having a first downwardly depending legs and a second downwardly depending legs fitted in said first and third grooves of said base plate and releasably contacting a brake conducting brake;

a switch rotatably mounted in a switch seat and having means for preventing unintentional pressing inwardly of said switch, wherein said switch when pressed will cause said first directional electrode to separate from said brake conducting plate and contact said cathode and cause said second directional electrode to separate from said brake conducting plate and contact said anode electrode, said switch when released will cause said first directional electrode to contact said second directional electrode via said brake braking plate, thereby controlling rotational direction of said motor and applying a brake thereto when said switch is turned off; and a braking block coupled to said switch, said braking block having a positioning rod which moves forward into a transmission gear coupled to said motor when said switch is rotated to a center position and moves out of said transmission gear when said switch is rotated from a center position.

\* \* \* \* \*